United States Patent Office 2,988,582
Patented June 13, 1961

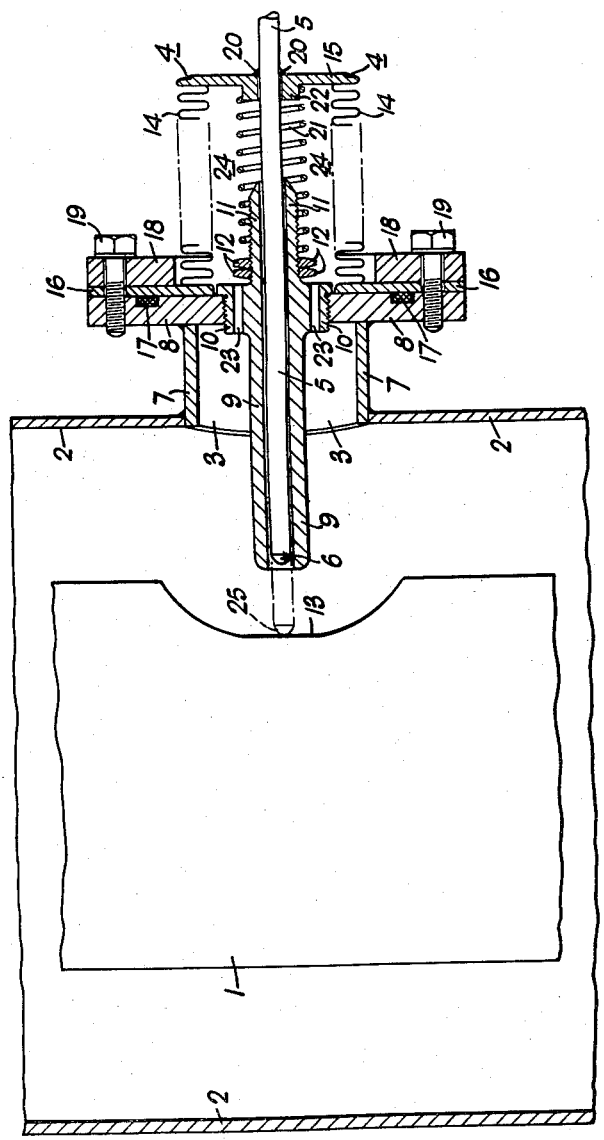

2,988,582
THERMOCOUPLE ARRANGEMENTS
Alan Gordon McGregor, Timperley, Altrincham, and Maurice Hale, Culcheth, Warrington, England, assignors to United Kingdom Atomic Energy Authority, London, England
Filed Feb. 6, 1959, Ser. No. 791,765
Claims priority, application Great Britain Feb. 19, 1958
8 Claims. (Cl. 136—4)

This invention relates to thermocouple arrangements.

A customary method of using thermocouple arrangements is to secure a junction of the thermocouple to the object the temperature of which is to be measured. This introduces certain features which are not always acceptable, such as:

(1) The need for detaching and re-attaching the thermocouple each time the object is moved any considerable distance.

(2) The need for providing flexible leads to permit of moderate operational movements of the object.

(3) The possibility of poor heat contact between the object and the thermocouple whereby a substantial time lag is introduced on the response of the thermocouple to temperature changes of the object.

(4) The fact that the thermocouple is always in contact with the object even though temperature readings may only be required at occasional times.

According to the present invention a thermocouple arrangement for measuring the temperature of a body inside a vessel by access through a hole in the vessel comprises a pressure sensitive flexible sealing member adapted to seal about the hole, and a thermocouple cable sealed to and passing through said member and terminating in a thermocouple junction so that the thermocouple junction can be advanced to press against the body on creating a pressure differential across said member.

By way of example, the invention will now be described with reference to the single figure of the accompanying drawing which is a partly diagrammatic sectional elevation.

In the drawing, a thermocouple arrangement for measuring the temperature of a body 1 inside a vessel 2 by access through a hole 3 in the vessel 2 comprises a pressure sensitive flexible sealing member 4 sealed about the hole 3, and a thermocouple cable 5 sealed to and passing through the member 4, and terminating in a thermocouple junction 6.

The hole 3 is bounded by a cylinder 7 welded to the vessel 2, and an internally screw-threaded annular plate 8 is welded to the cylinder 7. A tubular guide 9 is located centrally in the cylinder 7, the guide 9 having an externally screw-threaded flange part 10 engaging the screw-threaded part of the plate 8. The guide 9 also has an externally screw-threaded part 11 carrying two locknuts 12, and is aligned with a cavity 13 in the body 1. The sealing member 4 comprises a flexible bellows 14 sealed at one end to a circular and plate 15 and sealed at the other end to an annular end plate 16. The end plate 16 is sealed to the plate 8 by a sealing ring 17 and a ring plate 18, the plates 8, 16, 18 being clamped together by bolts 19. The cable 5 is sealed to the end plate 15 by a brazed joint 20 and passes through the end plate 15 and into the guide 9. Around the cable 5 there is a coil spring 21 which spans between the locknuts 12 and a central boss 22 of the end plate 15, the spring 21 being a tight fit on the boss 22. Passageways 23 through the flanged part 10 of the guide 9 connect the hole 3 with the space 24 between the cable 5 and the bellows 14.

In operation, a pressure differential is created across the sealing member 4 by evacuating the vessel 2. In this way the space 24 is evacuated via the hole 3 and the passageways 23 and the bellows 21 are collapsed so that the thermocouple junction 6 is advanced into the cavity 13 to press against the body 1, as shown by the chain-dotted outline 25. When the vacuum in the vessel 2 is released, the thermocouple junction 6 returns to its original position inside the guide 9. The thermocouple arrangement is designed so that the movement of the thermocouple junction 6 is approximately one inch, and the compression of the spring 21 is adjusted by means of the locknuts 12 so that the load between the thermocouple junction 6 and the body 1 at the point of contact in the cavity 13 is within the range of 0.5 to 2.0 lbs. The cable 5 is looped between its rigid point of support and the plate 15 to allow for movement.

In an alternative form, the sealing member 4 may be suitably enclosed, and a pressure differential created by pressurising the space between the sealing member 4 and its enclosing structure.

The invention as described above is particularly useful in association with vacuum apparatus such as in the melting and casting of reactive metals, the body 1 being a melting or casting pot. The operation is automatic and no manipulation or connection of thermocouples is required in setting up or removal of the pot. A close contact between the junction 6 and the pot is obtained: the junction 6 can, in fact, be made in the form of a blunt knife edge so that with a load of 12 lbs. the junction actually cuts a small distance into the body 1 to make a good thermal contact. Thermal movements of the pot are taken radially by movements of the cable 5 in the guide 9 and longitudinally by deflection of the part of the cable 5 that projects beyond the guide 9.

We claim:

1. Thermocouple apparatus comprising a collapsible bellows having an open end and a closed end, connecting means for connecting said bellows to a vessel with said opened end sealed to said vessel around an opening in said vessel for sealed communication between said bellows and said vessel, a thermocouple cable extending through said closed end of the bellows and connected to said closed end by a fixed and sealed connection and free to move longitudinally through said bellows as the closed end moves with expansion and contraction of the bellows, a thermocouple junction connected to the end of that portion of the cable extending from the closed end into the bellows.

2. The thermocouple apparatus of claim 1 further comprising guide means for guiding the longitudinal movement of said cable through said bellows.

3. A collapsible bellows having an open end and a closed end, a vessel sealed to the open end of said bellows and having an opening covered by said bellows for sealed communication between the inside of said vessel and the inside of said bellows, a thermocouple cable extending through said closed end of the bellows and connected to said closed end by a fixed and sealed connection and free to move longitudinally through said bellows as the closed end moves with expansion and contraction of the bellows, a thermocouple junction connected to the end of that portion of said cable extending from the closed end into the bellows.

4. The thermocouple apparatus of claim 3 in which said thermocouple junction is spaced at a predetermined distance from said closed end of said bellows such that when the bellows contracts the thermocouple junction is moved to a position to be exposed inside said vessel and when the bellows expands the junction is withdrawn from such exposure.

5. The thermocouple apparatus of claim 4 further comprising guide means for guiding the longitudinal movement of said cable through said bellows.

6. The thermocouple apparatus of claim 5 wherein said guide means comprises a tube fixed parallel with the axis of said bellows and through which said cable extends.

7. The thermocouple apparatus of claim 6 wherein said cable is positioned within said tube so that when the bellows expands the thermocouple junction is moved into said tube away from exposure to the inside of said vessel and when the bellows contracts said junction is moved out of said tube and exposed inside said vessel.

8. The thermocouple apparatus of claim 3 further comprising elastic means tending to expand the bellows.

References Cited in the file of this patent

UNITED STATES PATENTS

| | | |
|---|---|---|
| 2,218,779 | Wendt et al. | Oct. 22, 1940 |
| 2,326,217 | Hart | Aug. 10, 1943 |
| 2,839,594 | Schneidersmann | June 17, 1958 |